United States Patent
Das et al.

(10) Patent No.: US 10,949,278 B2
(45) Date of Patent: Mar. 16, 2021

(54) EARLY DETECTION OF EXECUTION ERRORS

(71) Applicant: QUALCOMM Incorporated, San Diego, CA (US)

(72) Inventors: Asutosh Das, Hyderabad (IN); Vijay Viswanath, Hyderabad (IN); Ritesh Harjani, Hyderabad (IN); Srinivasan Karunelli, Hyderabad (IN)

(73) Assignee: Qualcomm Incorporated, San Diego, CA (US)

( * ) Notice: Subject to any disclaimer, the term of this patent is extended or adjusted under 35 U.S.C. 154(b) by 178 days.

(21) Appl. No.: 16/018,575

(22) Filed: Jun. 26, 2018

(65) Prior Publication Data

US 2019/0391864 A1 Dec. 26, 2019

(51) Int. Cl.
| | |
|---|---|
| G06F 11/00 | (2006.01) |
| G06F 11/07 | (2006.01) |
| G06F 3/06 | (2006.01) |
| G06F 12/02 | (2006.01) |
| G06F 1/3234 | (2019.01) |

(52) U.S. Cl.
CPC ............ G06F 11/073 (2013.01); G06F 1/325 (2013.01); G06F 3/0619 (2013.01); G06F 3/0659 (2013.01); G06F 12/0246 (2013.01); G06F 3/0673 (2013.01)

(58) Field of Classification Search
CPC . G06F 11/073; G06F 11/0763; G06F 11/0766
See application file for complete search history.

(56) References Cited

U.S. PATENT DOCUMENTS

| | | | | |
|---|---|---|---|---|
| 6,243,839 B1 * | 6/2001 | Roohparvar | ........... | G11C 29/34 365/185.29 |
| 6,381,721 B1 * | 4/2002 | Warren | ............ | G01R 31/31855 714/727 |
| 7,180,803 B2 * | 2/2007 | Santin | ................ | G11C 29/1201 365/189.05 |
| 7,558,941 B2 * | 7/2009 | Gabel | ................. | G06F 12/0813 711/217 |
| 7,916,820 B2 * | 3/2011 | Cranford, Jr. | ......... | H04L 7/0334 370/503 |
| 8,151,173 B2 * | 4/2012 | Hirose | ................ | G06F 11/1048 714/785 |
| 9,411,537 B2 * | 8/2016 | Kim | ...................... | G06F 3/0659 |
| 9,424,153 B2 * | 8/2016 | Cho | ...................... | G06F 11/263 |
| 2017/0147431 A1 * | 5/2017 | West | ..................... | G06F 3/0679 |
| 2017/0308326 A1 * | 10/2017 | Yarovoy | ............... | G06F 3/0659 |

* cited by examiner

*Primary Examiner* — Elmira Mehrmanesh
(74) *Attorney, Agent, or Firm* — Patterson & Sheridan, L.L.P.

(57) ABSTRACT

Certain aspects of the present disclosure provide apparatus and techniques for communicating error information during memory operations. For example, certain aspects of the present disclosure may provide a method for memory operations. The method generally including receiving a command from a host device, performing memory operations corresponding to the command received from the host device, detecting an error during the memory operations, and communicating the error based on the detection, wherein the error is communicated before receiving another command from the host device.

20 Claims, 6 Drawing Sheets

EARLY DETECTION OF EXECUTION ERRORS

TECHNICAL FIELD

The teachings of the present disclosure relate generally to memory operations, and more particularly, to techniques for detecting error during memory operations.

INTRODUCTION

Non-volatile memory is a type of memory that can store and hold data without a constant source of power. In contrast, data stored in volatile memory may be erased if power to the memory is lost. Flash memory is a type of non-volatile memory, and more specifically, embedded multimedia card (eMMC) flash memory has become popular in mobile applications.

BRIEF SUMMARY

The following presents a simplified summary of one or more aspects of the present disclosure, in order to provide a basic understanding of such aspects. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in a simplified form as a prelude to the more detailed description that is presented later.

Certain aspects of the present disclosure provide apparatus and techniques for communicating error information during memory operations.

Certain aspects of the present disclosure provide a method for performing memory operations. The method generally including receiving a command from a host device, performing memory operations corresponding to the command received from the host device, detecting an error during the memory operations, and communicating the error based on the detection, wherein the error is communicated before receiving another command from the host device.

Certain aspects of the present disclosure may provide a method for performing memory operations. The method generally includes sending a memory command for performing memory operations, sampling a data line of a plurality of data lines before sending another command, and detecting whether an error has occurred during the memory operations based on the sampling of the data line.

Certain aspects of the present disclosure may provide an apparatus for performing memory operations. The apparatus generally includes a memory, and a processing system configured to receiving a command from a host device, performing memory operations corresponding to the command received from the host device, detecting an error during the memory operations, and communicating the error based on the detection, wherein the error is communicated before receiving another command from the host device.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects.

DETAILED DESCRIPTION

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

The various embodiments will be described in detail with reference to the accompanying drawings. Wherever possible, the same reference numbers will be used throughout the drawings to refer to the same or like parts. References made to particular examples and implementations are for illustrative purposes, and are not intended to limit the scope of the invention or the claims.

The terms "computing device" and "mobile device" are used interchangeably herein to refer to any one or all of servers, personal computers, smartphones, cellular telephones, tablet computers, laptop computers, netbooks, ultrabooks, palm-top computers, personal data assistants (PDA's), wireless electronic mail receivers, multimedia Internet enabled cellular telephones, Global Positioning System (GPS) receivers, wireless gaming controllers, and similar personal electronic devices which include a programmable processor. While the various aspects are particularly useful in mobile devices (e.g., smartphones, laptop computers, etc.), which have limited resources (e.g., processing power, battery, etc.), the aspects are generally useful in any computing device that may benefit from improved processor performance and reduced energy consumption.

The term "multicore processor" is used herein to refer to a single integrated circuit (IC) chip or chip package that contains two or more independent processing units or cores (e.g., CPU cores, etc.) configured to read and execute program instructions. The term "multiprocessor" is used herein to refer to a system or device that includes two or more processing units configured to read and execute program instructions.

The term "system on chip" (SoC) is used herein to refer to a single integrated circuit (IC) chip that contains multiple resources and/or processors integrated on a single substrate. A single SoC may contain circuitry for digital, analog, mixed-signal, and radio-frequency functions. A single SoC may also include any number of general purpose and/or specialized processors (digital signal processors, modem processors, video processors, etc.), memory blocks (e.g., ROM, RAM, Flash, etc.), and resources (e.g., timers, voltage regulators, oscillators, etc.), any or all of which may be included in one or more cores.

A number of different types of memories and memory technologies are available or contemplated in the future, all of which are suitable for use with the various aspects of the present disclosure. Such memory technologies/types include phase change memory (PRAM), dynamic random-access memory (DRAM), static random-access memory (SRAM), non-volatile random-access memory (NVRAM), flash memory (e.g., embedded multimedia card (eMMC) flash), pseudostatic random-access memory (PSRAM), double data rate synchronous dynamic random-access memory (DDR SDRAM), and other random-access memory (RAM) and read-only memory (ROM) technologies known in the art. A DDR SDRAM memory may be a DDR type 1 SDRAM memory, DDR type 2 SDRAM memory, DDR type 3 SDRAM memory, or a DDR type 4 SDRAM memory. Each of the above-mentioned memory technologies include, for example, elements suitable for storing instructions, programs, control signals, and/or data for use in or by a computer or other digital electronic device. Any references to terminology and/or technical details related to an individual type of memory, interface, standard or memory technology are for illustrative purposes only, and not intended to limit the scope of the claims to a particular memory system or technology unless specifically recited in the claim language. Mobile computing device architectures have grown in complexity, and now commonly include multiple processor cores, SoCs, co-processors, functional modules including dedicated processors (e.g., communication modem chips, GPS receivers, etc.), complex memory systems, intricate electrical interconnections (e.g., buses and/or fabrics), and numerous other resources that execute complex and power intensive software applications (e.g., video streaming applications, etc.).

Figure 1:
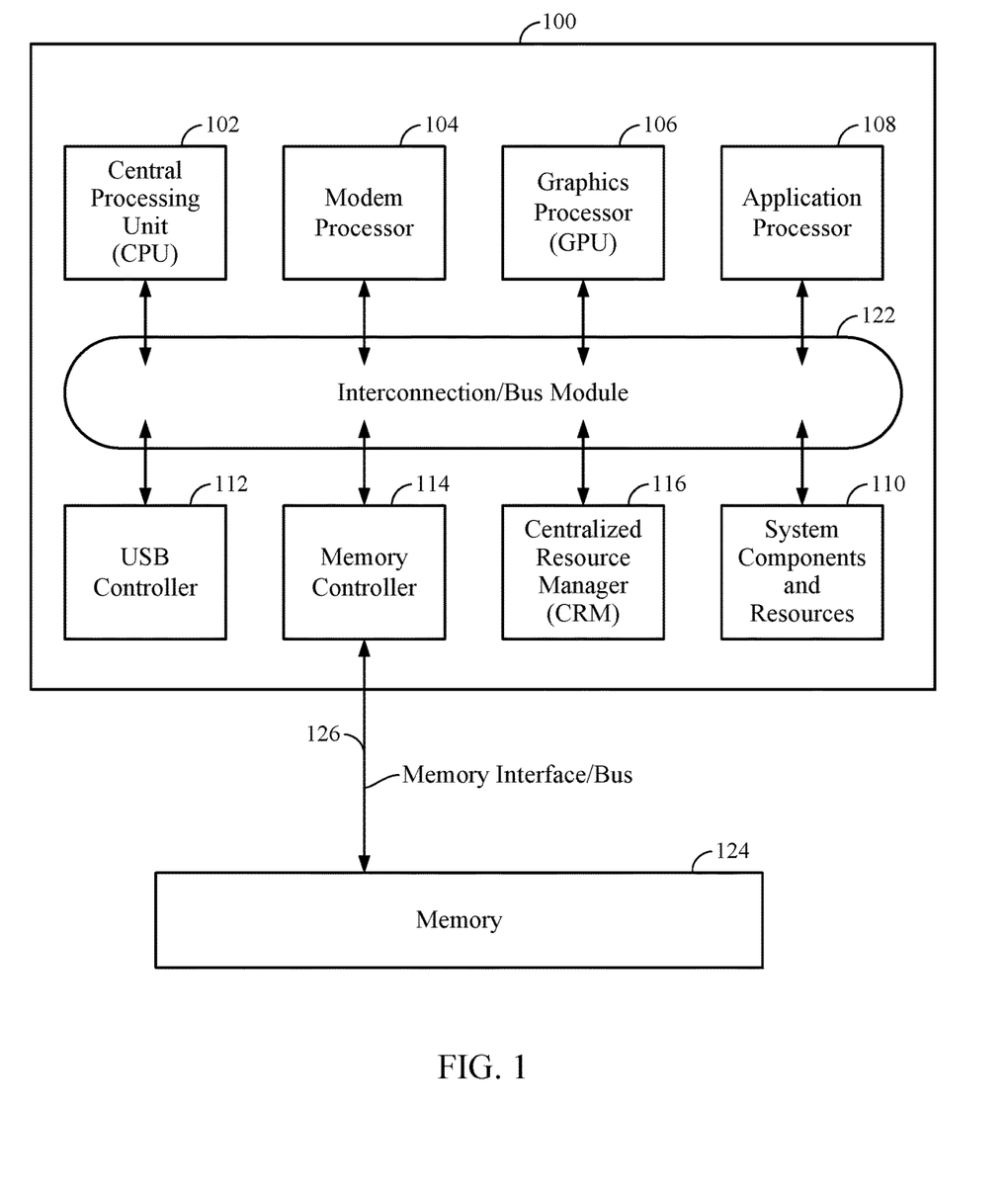
FIG. 1 is an illustration of an exemplary system-on-chip (SoC) integrated circuit design, in accordance with certain aspects of the present disclosure.

FIG. 1 illustrates example components and interconnections in a system-on-chip (SoC) 100 suitable for implementing various aspects of the present disclosure. The SoC 100 may include a number of heterogeneous processors, such as a central processing unit (CPU) 102, a modem processor 104, a graphics processor 106, and an application processor 108. Each processor 102, 104, 106, 108, may include one or more cores, and each processor/core may perform operations independent of the other processors/cores. The processors 102, 104, 106, 108 may be organized in close proximity to one another (e.g., on a single substrate, die, integrated chip, etc.) so that they may operate at a much higher frequency/clock-rate than would be possible if the signals were to travel off-chip. The proximity of the cores may also allow for the sharing of on-chip memory and resources (e.g., voltage rail), as well as for more coordinated cooperation between cores.

The SoC 100 may include system components and resources 110 for managing sensor data, analog-to-digital conversions, wireless data transmissions, and for performing other specialized operations (e.g., decoding high-definition video, video processing, etc.). System components and resources 110 may also include components such as voltage regulators, oscillators, phase-locked loops, peripheral bridges, data controllers, system controllers, access ports, timers, and other similar components used to support the processors and software clients running on the computing device. The system components and resources 110 may also include circuitry for interfacing with peripheral devices, such as cameras, electronic displays, wireless communication devices, external memory chips, etc.

The SoC 100 may further include a universal serial bus controller 112, one or more memory controllers 114, and a centralized resource manager (CRM) 116. In certain aspects, the one or more memory controllers 114 may be host devices used to write data to an eMMC flash memory, as described in more detail herein. The SoC 100 may also include an input/output module (not illustrated) for communicating with resources external to the SoC each of which may be shared by two or more of the internal SoC components.

The processors 102, 104, 106, 108 may be interconnected to the USB controller 112, the memory controller 114, system components and resources 110, CRM 116, and other system components via an interconnection/bus module 122, which may include an array of reconfigurable logic gates and/or implement a bus architecture (e.g., CoreConnect, AMBA, etc.). Communications may also be provided by advanced interconnects, such as high performance networks-on chip (NoCs).

The interconnection/bus module 122 may include or provide a bus mastering system configured to grant SoC components (e.g., processors, peripherals, etc.) exclusive control of the bus (e.g., to transfer data in burst mode, block transfer mode, etc.) for a set duration, number of operations, number of bytes, etc. In some cases, the bus module 122 may implement an arbitration scheme to prevent multiple master components from attempting to drive the bus simultaneously.

The memory controller 114 may be a specialized hardware module configured to manage the flow of data to and from a memory 124 (e.g., eMMC flash memory) via a memory interface/bus 126. For example, the memory controller 114 may comprise one or more processors configured to perform operations disclosed herein. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. In certain aspects, the memory 124 may be part of the SoC 100. In certain aspects, the memory 124 may be implemented as an eMMC flash memory.

Figure 2:
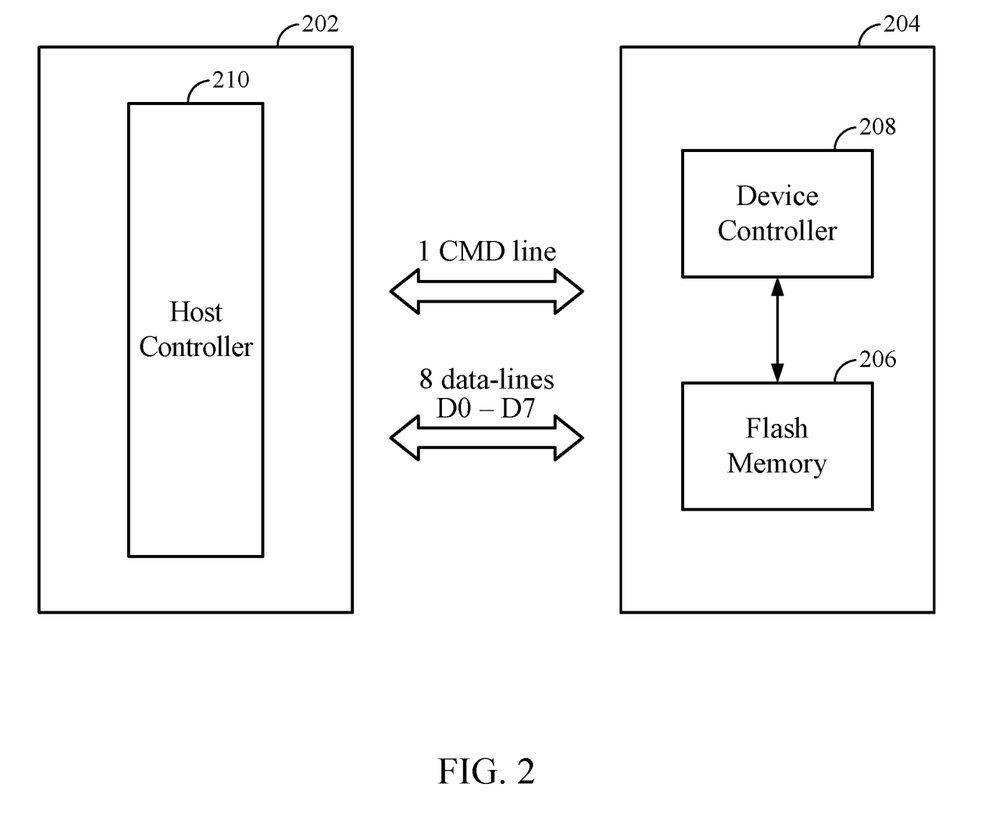
FIG. 2 illustrates a host device and a memory controller for performing memory operations, in accordance with certain aspects of the present application.

FIG. 2 illustrates a host device 202 (e.g., having a host controller 210) and a memory device 204 for performing memory operations, in accordance with certain aspects of the present application. For example, the memory operations may include memory write operation for writing data to a memory 206 (e.g., flash memory). A command line may be implemented to communicate read and write commands to a device controller 208. Multiple data lines (e.g., eight data lines D0-D7) may be coupled between the host device 202 and the device controller 208 for communicating the data to be written to the memory 206. The memory 206 may correspond to the memory 124 and the host controller 210 may correspond to the memory controller 114, as described with respect to FIG. 1.

During memory operations, certain types of errors may only be detected during execution. For example, memory 206 (e.g., eMMC flash memory) may support write-protect functions by designating certain blocks in the memory 206 as write-protected. Any attempt to write to or erase data from a write-protected area of the memory 206 may cause a write protect violation during execution.

Current implementations of error reporting such as reporting a write-protect error (WPE) has an adverse impact on the memory operations. For example, an application may attempt to write data to the memory 206 in a write-protected area of the memory 206. In some scenarios, the host controller 210 of the host device 202 may respond to the application that the write operations have been successfully completed, whereas, the write operations have silently incurred a write error (e.g., a WPE) due to being to a write-protected area of the memory 206. For example, when the last block of data that is being written to the memory 206 falls on a write protected area, a WPE occurs. However, the WPE may only be communicated to the host controller 210 after a following command has been sent to the device controller 208, which may lead to data corruption. For instance, the host controller 210 may indicate to an application that the write operations were successful, where in fact, the write operations incurred a write error, which may lead to data corruption since the application has been falsely notified that the write operations were successful.

Figure 3:
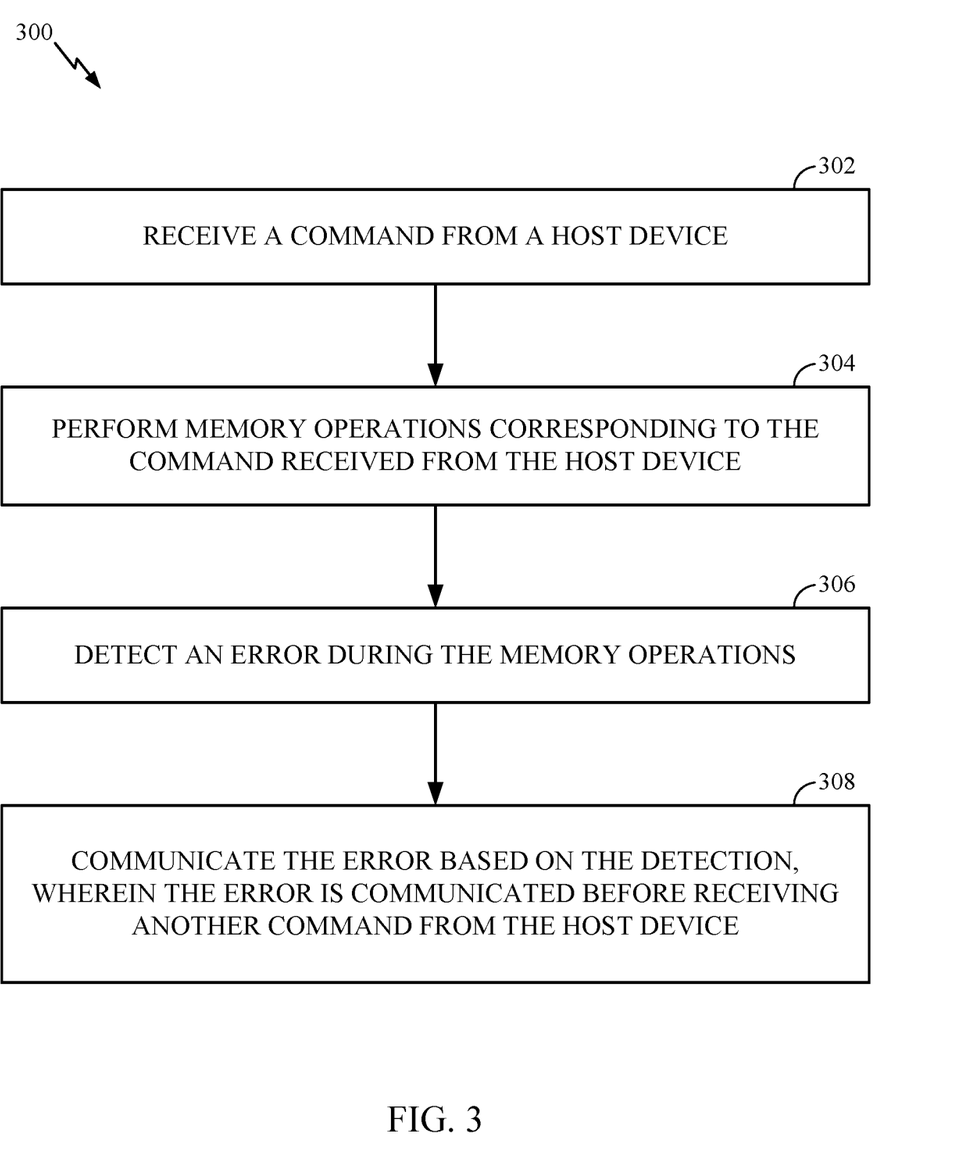
FIG. 3 is a flow diagram of example memory operations by a device controller, in accordance with certain aspects of the present disclosure.

FIG. 3 is a flow diagram of example memory operations 300, in accordance with certain aspects of the present disclosure. The operations 300 may be performed, for example, by a device controller, such as the device controller 208.

Operations 300 may begin, at block 302, by receiving a command (e.g., from the host device 202) from a host device, and at block 304, by performing memory operations corresponding to the command received from the host device, and at block 306, detecting an error (e.g., WPE) during the memory operations. At block 308, the operations 300 continue by communicating the error based on the detection, wherein the error is communicated before receiving another command from the host device.

In certain aspects, the command received from the host device may be an erase command. In this case, the memory operations involve erasing one or more memory location of a memory in response to the erase command.

In certain aspects, the command received from the host device may be comprises a write command. In this case, the operations 300 also include receiving, via a plurality of data lines, data to be written to memory corresponding to the write command, and the memory operations comprise writing the data to a memory.

In certain aspects, communicating the error may include setting a data line (e.g., data line D0) of the plurality of data lines for multiple consecutive cycles in accordance with a bit pattern. For example, setting the data line in accordance with the bit pattern may include setting the data line to logic high during a first clock cycle, to logic low during a second clock cycle, and to logic high during a third clock cycle, as described in more detail herein.

Figure 4:
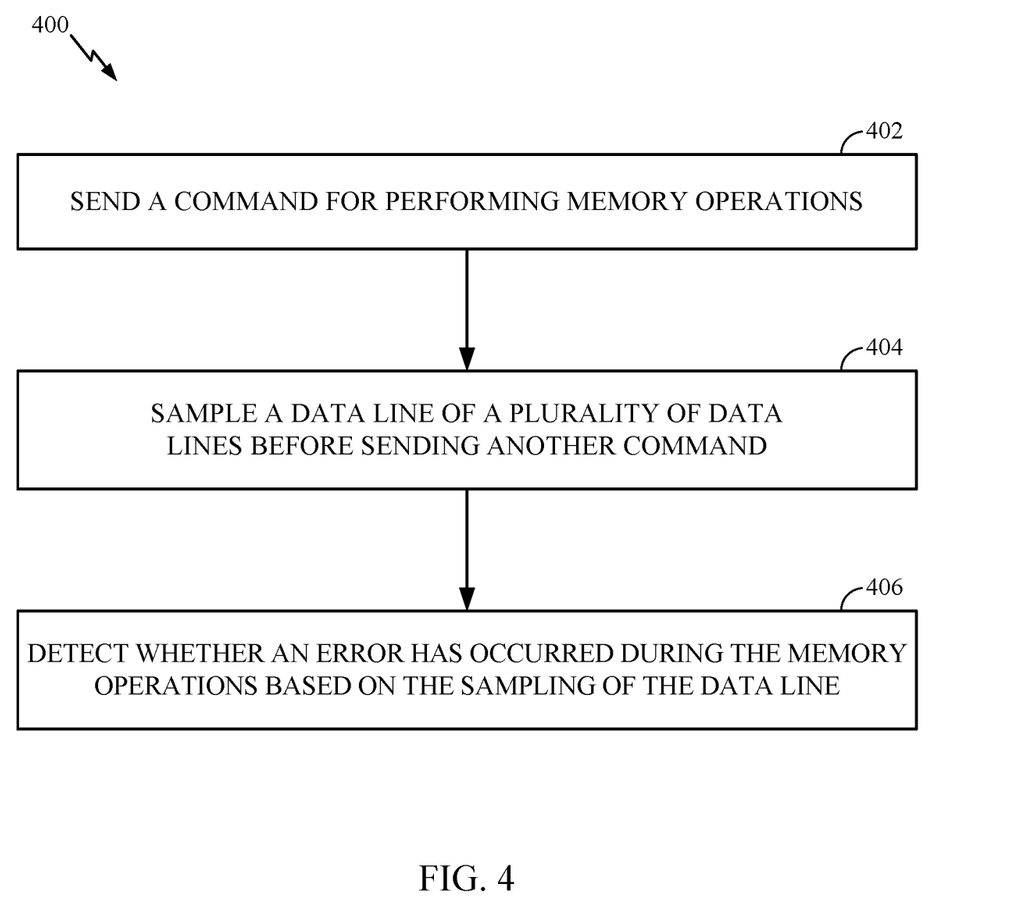
FIG. 4 is a flow diagram of example memory operations by a host device, in accordance with certain aspects of the present disclosure.

FIG. 4 is a flow diagram of example memory write operations 400, in accordance with certain aspects of the present disclosure. The operations 400 may be performed, for example, by a host device, such as the host device 202.

Operations 400 may begin, at block 402, by sending a command, for performing memory operations and at block 404, sampling a data line of the plurality of data lines before sending another command. At block 406, the operations 400 continue by detecting whether an error has occurred based on the sampling of the data line.

In certain aspects, the command for performing the memory operations may be an erase command for erasing one or more memory locations of a memory. In certain aspects, the command may be a write command. In this case, the operations 400 also include sending data, via a plurality of data lines, to be written to a memory corresponding to the write command and the data line is sampled after sending the data.

In certain aspects, detecting whether the error occurred comprises detecting a bit pattern on the data line across multiple consecutive clock cycles. For instance, detecting the bit pattern may include detecting the data line at logic high during a first clock cycle, at logic low during a second clock cycle, and at logic high during a third clock cycle, as described in more detail herein.

Figure 5A:
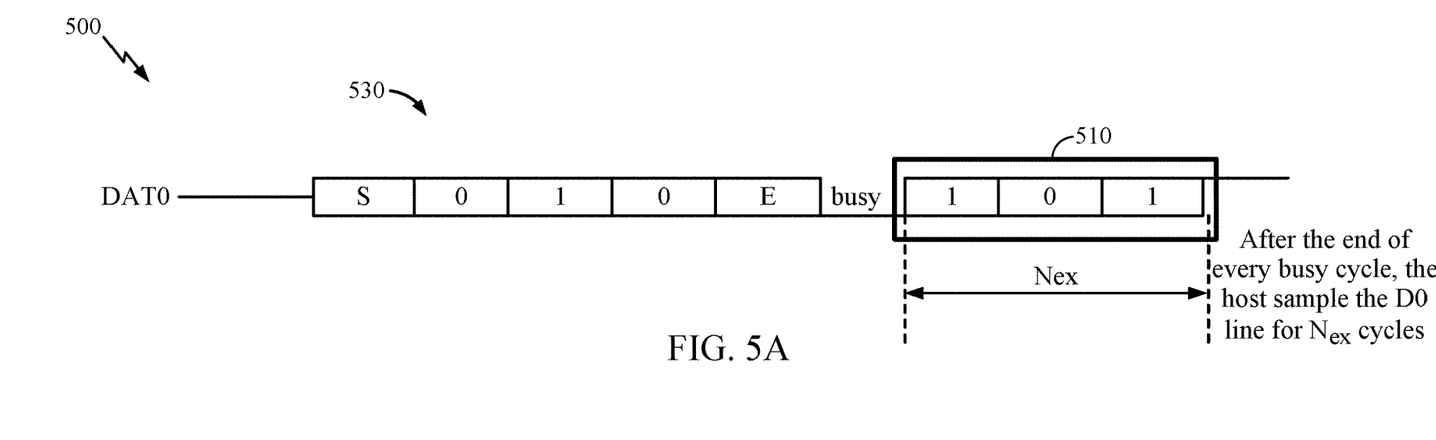
FIG. 5A is a timing diagram illustrating a data line coupled to a memory, in accordance with certain aspects of the present disclosure.

FIG. 5A is an example timing diagram 500 illustrating signals communicated on a data line (e.g., data line D0) coupled to the memory 206, in accordance with certain aspects of the present disclosure. During the data transfer period 530, data is transferred to the device controller 208, after which a busy period begins. The data transfer period 530 begins with a start block (S) indicating the beginning of the data transfer period 530 and an end block (E) indicating the end of the data transfer period 530. During the busy period when the device controller 208 is writing data to the memory, if a WPE is detected by the device controller 208, the device controller 208 sets the data line D0 (also referred to herein as a least significant bit data line) in accordance with a bit pattern. For example, the data line may be set, during the clock cycles 510, to logic high (shown as "1" in FIG. 5A), logic low (shown as "0" in FIG. 5A), and logic high (shown as "1" in FIG. 5A), as illustrated. The host device 202 may sample the data line D0 to detect the bit pattern, the detection of which indicates to the host device 202 that a WPE has occurred.

In the example timing diagram 500, three consecutive clock cycles are used to communicate a write error to the host device 202 allowing for detectable bit pattern to be communicated on the data line D0. However, any number of consecutive clock cycles may be used to communicate a bit pattern to the host device 202 to indicate that a write error has occurred. In certain aspects, the bit pattern may be selected as to avoid false detection of an error by the host device 202. For example, the bit pattern may be different than any bit pattern that may be present at the beginning of a command that would otherwise be sent to the host device 202 after the busy period.

Figure 5B:
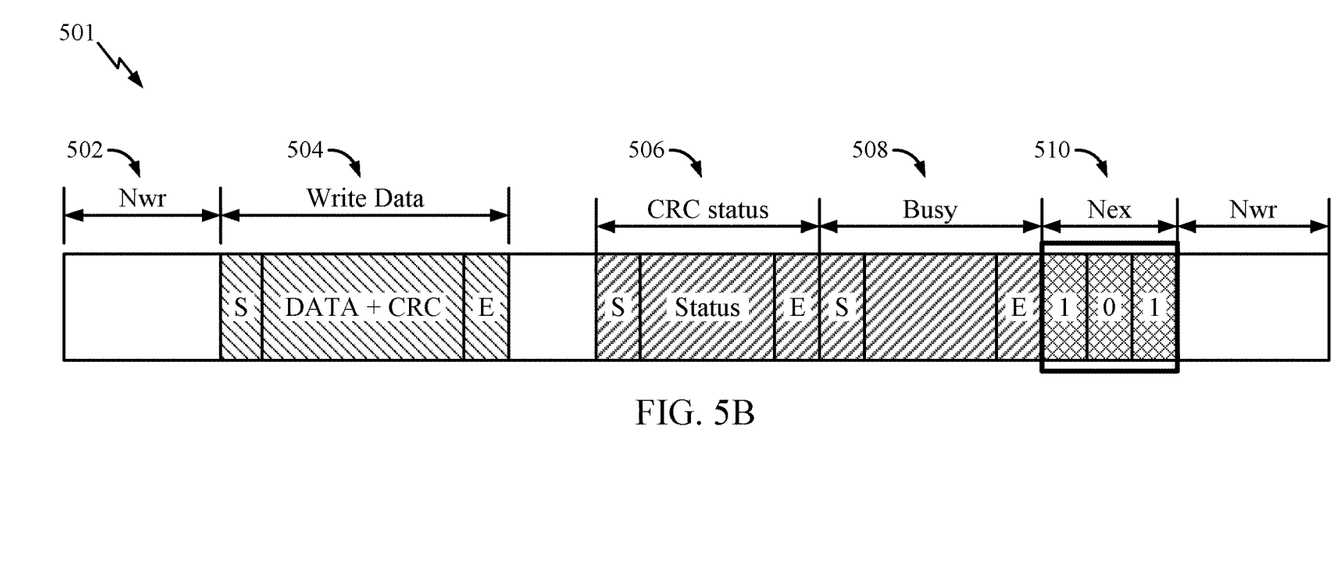
FIG. 5B is a block diagram illustrating timing of memory write operations, in accordance with certain aspects of the present disclosure.

FIG. 5B is a block diagram 501 illustrating timing of memory write operations, in accordance with certain aspects of the present disclosure. For example, during the command period 502, a write command (Nwr) may be received by the device controller 208 from the host device 202, followed by the data to be written to the memory during the data write period 504. The data communicated during the data write period 504 includes cyclic redundancy check (CRC) information. After the data has been transferred from the host device 202 to the device controller 208, a CRC status is sent back by the device controller 208 to the host device 202 during the CRC status period 506. After the CRC status period 506, the device controller 208 may begin a busy period while writing the data to the memory 206. For example, the device controller 208 may hold the data line D0 at logic low to indicate that the device controller 208 is busy performing write operations. If at any time during the write operations the device controller 208 encounters a WPE, the device controller sets the data line (e.g., data line D0) in accordance with a bit pattern (e.g., logic high, logic low, logic high) for several cycles, as described herein, indicating to the host device 202 that a WPE has occurred.

While FIGS. 5A and 5B provide examples for performing memory write operations to facilitate understanding, aspects described herein may be applied to any type of memory operations. For example, instead of a write command, the device controller 208 may receive a memory erase command for erasing one or more memory location of the memory 206. In this case, the device controller 208 may set the data line D0 to logic low indicating a busy period. If an error is detected, then device controller 208 may set the data line D0 in accordance with a bit pattern, as described herein, to indicate to the host device 202 that an error has occurred. For example, the error may be a WPE if a memory location of the memory 206 being erased during memory erase operations is write-protected.

Figure 6:
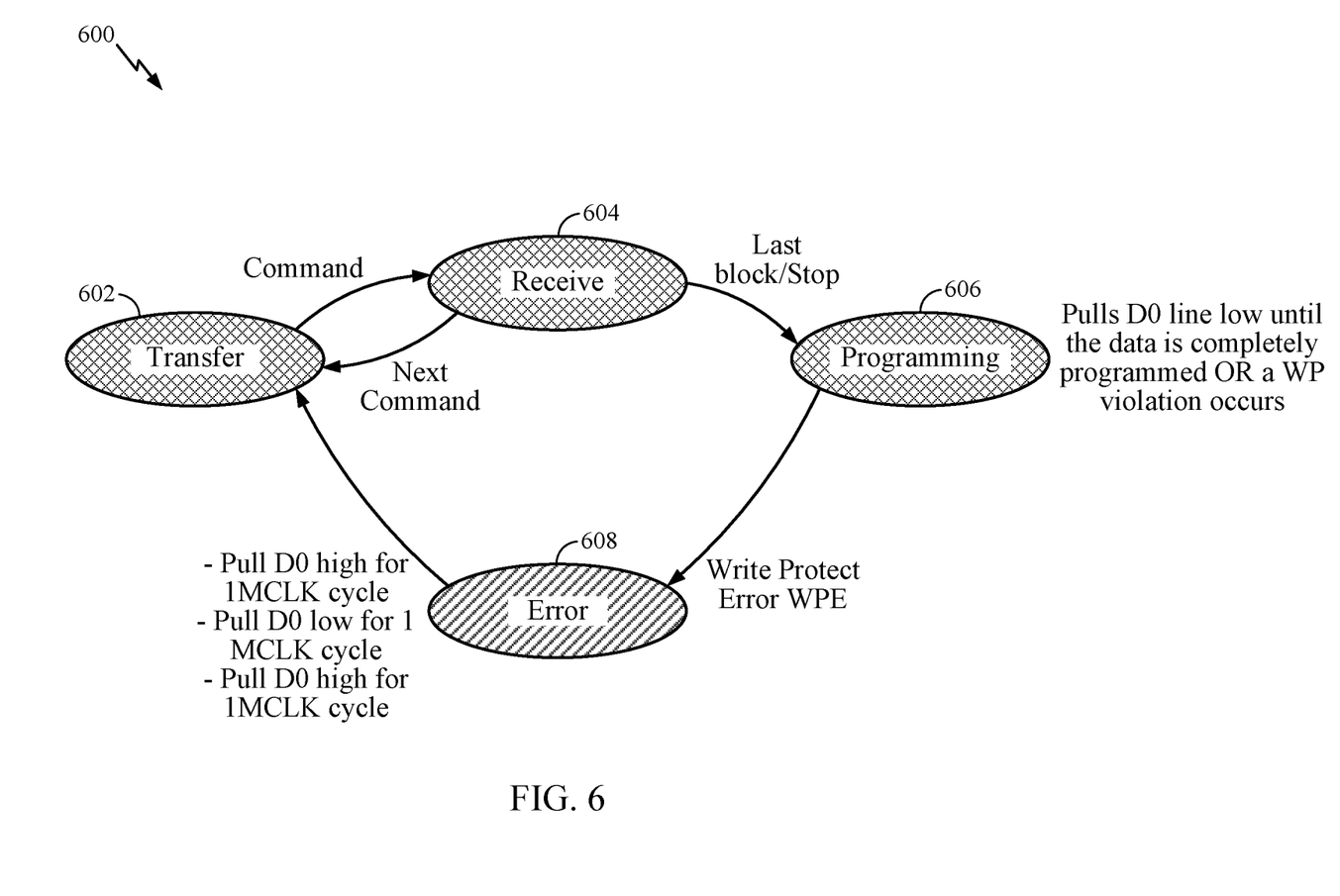
FIG. 6 is a flow diagram illustrating example operations for memory operations, in accordance with certain aspects of the present disclosure.

FIG. 6 is a flow diagram illustrating example operations 600 for memory write operations, in accordance with certain aspects of the present disclosure. At block 602, the host device 202 may determine to send a command for performing memory operations to the device controller 208. For example, the host device 202 may determine to transfer data to be written to the memory 206, and send a write command followed by data to be written to the memory as described herein. At block 604, the device controller 208 receives the command, as well as data to be written to the memory if the command is a write command. At block 606, the device controller 208 proceeds with performing the memory operations (e.g., programming). For example, if the command is a write command, the device controller 208 performs write operations after the last block of data is received. During the memory operations at block 606, the device controller 208 pulls the data line D0 to logic low, indicating a busy period, until the memory operations are completed, or until a WPE occurs. If a WPE occurs, the operations 600 continue at block 608 by the device controller 208 setting the data line D0 in accordance with a bit pattern. For example, the data line D0 may be set to logic high during a first clock cycle (e.g., master clock (MCLK) cycle), to logic low during a second cycle, and to logic high during a third clock cycle, indicating to the host device 202 that a WPE has occurred. Subsequently, the operations 600 continue to block 602, where the host device 202 may transfer another command to the memory 206.

Certain aspects of the present disclosure provide techniques for communicating error information to a host device in a manner that reduces the likelihood of data loss in case of an error. As presented above, in conventional techniques for communicating error information, a host controller may respond to an application that write operations have been successfully completed, whereas, the write operations have silently incurred a write error, resulting in data loss. Moreover, aspects of the present disclosure reduce overhead by communicating the write error before a following command is received from the host device 202 as opposed to conventional techniques that require multiple commands to detect certain types of errors.

In some configurations, the term(s) 'communicate,' 'communicating,' and/or 'communication' may refer to 'receive,' 'receiving,' 'reception,' and/or other related or suitable aspects without necessarily deviating from the scope of the present disclosure. In some configurations, the term(s) 'communicate,' 'communicating,' 'communication,' may refer to 'transmit,' 'transmitting,' 'transmission,' and/or other related or suitable aspects without necessarily deviating from the scope of the present disclosure.

Within the present disclosure, the word "exemplary" is used to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage or mode of operation. The term "coupled" is used herein to refer to the direct or indirect coupling between two objects. For example, if object A physically touches object B, and object B touches object C, then objects A and C may still be considered coupled to one another—even if they do not directly physically touch each other. For instance, a first object may be coupled to a second object even though the first object is never directly physically in contact with the second object. The terms "circuit" and "circuitry" are used broadly, and intended to include both hardware implementations of electrical devices and conductors that, when connected and configured, enable the performance of the functions described in the present disclosure, without limitation as to the type of electronic circuits.

One or more of the components, steps, features and/or functions illustrated herein may be rearranged and/or combined into a single component, step, feature or function or embodied in several components, steps, or functions. Additional elements, components, steps, and/or functions may also be added without departing from novel features disclosed herein. The apparatus, devices, and/or components illustrated herein may be configured to perform one or more of the methods, features, or steps described herein. The novel algorithms described herein may also be efficiently implemented in software and/or embedded in hardware.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

These apparatus and methods described in the detailed description and illustrated in the accompanying drawings by various blocks, modules, components, circuits, steps, processes, algorithms, etc. (collectively referred to as "elements"). These elements may be implemented using hardware, software, or combinations thereof. Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, firmware, routines, subroutines, objects, executables, threads of execution, procedures, functions, etc., whether referred to as software, firmware, middleware, microcode, hardware description language, or otherwise.

Accordingly, in one or more exemplary embodiments, the functions described may be implemented in hardware, software, or combinations thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise RAM, ROM, EEPROM, PCM (phase change memory), flash memory, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

What is claimed is:

1. A method for performing memory operations, comprising:
   receiving, by a device controller, a command from a host device, wherein a plurality of data lines are coupled between the device controller and the host device for indicating data to be written to memory;
   performing, by the device controller, memory operations corresponding to the command received from the host device;
   detecting, by the device controller, an error during the memory operations; and
   communicating, by the device controller, the error based on the detection, wherein the error is communicated via a data line of the plurality of data lines before receiving another command from the host device.

2. The method of claim 1, wherein:
   the command comprises an erase command; and
   the memory operations comprise erasing one or more memory location of the memory in response to the erase command.

3. The method of claim 1, wherein:
   the command comprises a write command;
   the method further comprises receiving, via the plurality of data lines, the data to be written to the memory corresponding to the write command; and
   the memory operations comprise writing the data to the memory.

4. The method of claim 3, wherein receiving the data comprises receiving a plurality of data blocks to be written to the memory, wherein the error is communicated after a last data block of the plurality of data blocks is received.

5. The method of claim 4, wherein the error is communicated during a busy cycle, the busy cycle being after the last data block of the plurality of data blocks is received.

6. The method of claim 5, further comprising setting the data line of the plurality of data lines to logic low during the busy cycle until the error is detected.

7. The method of claim 1, wherein:
   communicating the error comprises setting the data line of the plurality of data lines for multiple consecutive clock cycles in accordance with a bit pattern.

8. The method of claim 7, wherein setting the data line in accordance with the bit pattern comprises setting the data line to logic high during a first clock cycle, to logic low during a second clock cycle, and to logic high during a third clock cycle, the second clock cycle being between the first clock cycle and the third clock cycle.

9. The method of claim 7, wherein the data line comprises a least significant bit data line of the plurality of data lines.

10. The method of claim 1, wherein the memory operations comprises writing data to or erasing data from an embedded multimedia card (eMMC) flash memory.

11. The method of claim 1, wherein the error comprises a write protect error.

12. A method for performing memory operations, comprising:
   sending, by a host device, a command to a device controller for performing memory operations, a plurality of data lines being coupled between the device controller and the host device for indicating data to be written to memory;
   sampling, by the host device, a data line of the plurality of data lines before sending another command; and
   detecting, by the host device, whether an error has occurred during the memory operations based on the sampling of the data line.

13. The method of claim 12, wherein the command for performing memory operations comprises an erase command for erasing one or more memory location of the memory.

14. The method of claim 12, wherein:
   the command comprises a write command;
   the method further comprises sending the data, via the plurality of data lines, to be written to the memory corresponding to the write command; and
   the data line is sampled after sending the data.

15. The method of claim 14, wherein sending the data comprises sending a plurality of data blocks to be written to the memory, wherein the data line is sampled to detect the error after a last data block of the plurality of data blocks is sent.

16. The method of claim 15, wherein the error is detected during a busy cycle, the busy cycle being after the last data block of the plurality of data blocks is sent.

17. The method of claim 16, wherein the data line of the plurality of data lines is set to logic low during the busy cycle until the error is detected.

18. The method of claim 12, wherein:
   detecting whether the error occurred comprises detecting a bit pattern on the data line across multiple consecutive clock cycles.

19. The method of claim 18, wherein detecting the bit pattern comprises detecting the data line at logic high during a first clock cycle, at logic low during a second clock cycle, and at logic high during a third clock cycle, the second clock cycle being between the first clock cycle and the third clock cycle.

20. An apparatus for performing memory operations, comprising:
   a memory; and
   a device controller coupled to the memory and configured to:
      receive, by the device controller, a command from a host device, a plurality of data lines being coupled between the device controller and the host device for indicating data to be written to the memory;
      perform, by the device controller, memory operations corresponding to the command received from the host device;
      detect, by the device controller, an error during the memory operations; and
      communicate, by the device controller, the error based on the detection, wherein the error is communicated via a data line of the plurality of data lines before receiving another command from the host device.

* * * * *